Figure 1:
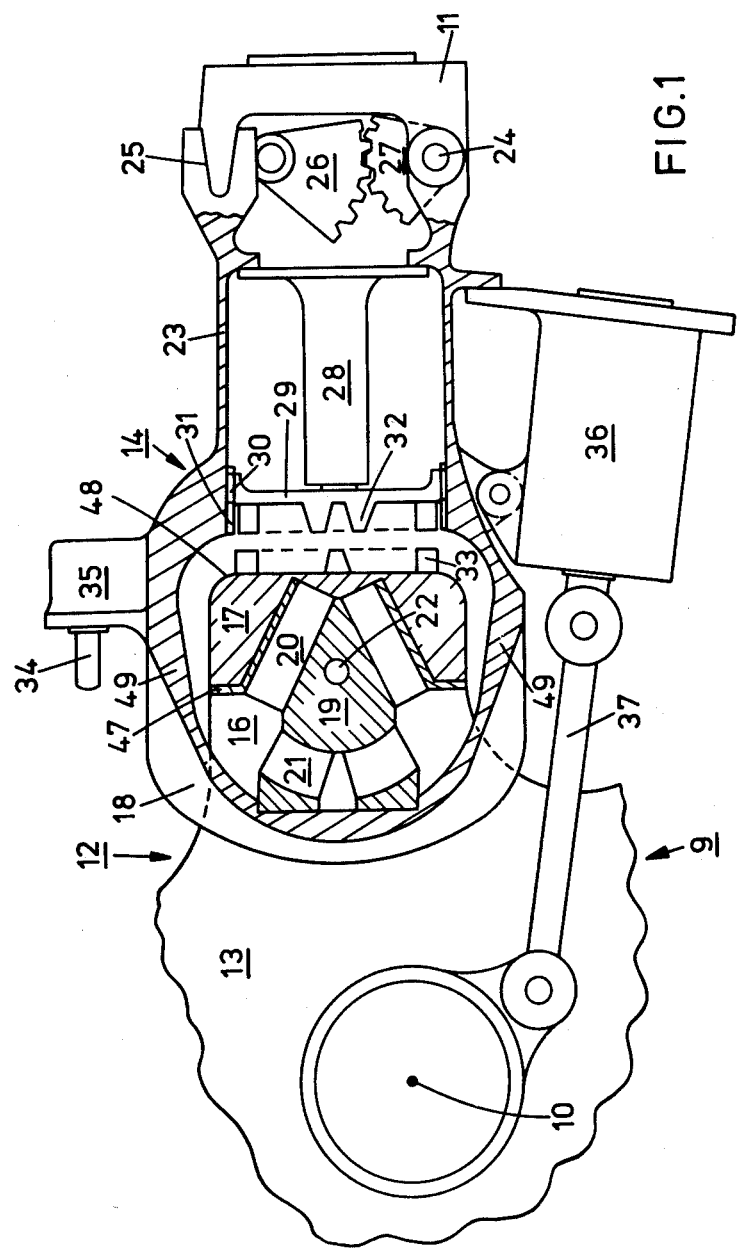

United States Patent [19]

Watson

[11] 4,028,001
[45] June 7, 1977

[54] ROTOR FOR ROTARY WING AIRCRAFT
[75] Inventor: Kenneth Watson, Yeovil, England
[73] Assignee: Westland Aircraft Limited, Yeovil, England
[22] Filed: July 28, 1975
[21] Appl. No.: 599,785
[52] U.S. Cl. .................... 416/134 A; 416/141; 416/143
[51] Int. Cl.² ........................................ B64C 27/38
[58] Field of Search ................... 416/134, 141, 143
[56] References Cited
UNITED STATES PATENTS

| | | | |
|---|---|---|---|
| 3,097,701 | 7/1963 | Buivid | 416/143 |
| 3,153,455 | 10/1964 | Mosinskis | 416/143 X |
| 3,187,818 | 6/1965 | Barrett et al. | 416/143 X |
| 3,282,350 | 11/1966 | Kisovec | 416/143 |
| 3,438,446 | 4/1969 | Vacca et al. | 416/143 |
| 3,761,199 | 9/1973 | Ferris et al. | 416/141 X |
| 3,853,426 | 12/1974 | Rybicki | 416/141 X |
| 3,862,812 | 1/1975 | Gorndt et al. | 416/141 |

Primary Examiner—Everette A. Powell, Jr.
Attorney, Agent, or Firm—Larson, Taylor and Hinds

[57] ABSTRACT

This invention provides a rotor hub for a rotary wing aircraft in which elastomeric bearing means are utilized to transmit centrifugal loads and blade pitch, flap and lead lag movements, and in which the blades are foldable about a pivot located outboard of the elastomeric bearing means between extended and folded positions. Locking means are provided to ensure that no deflection of the elastomeric bearing means occurs during the folding operation.

18 Claims, 2 Drawing Figures

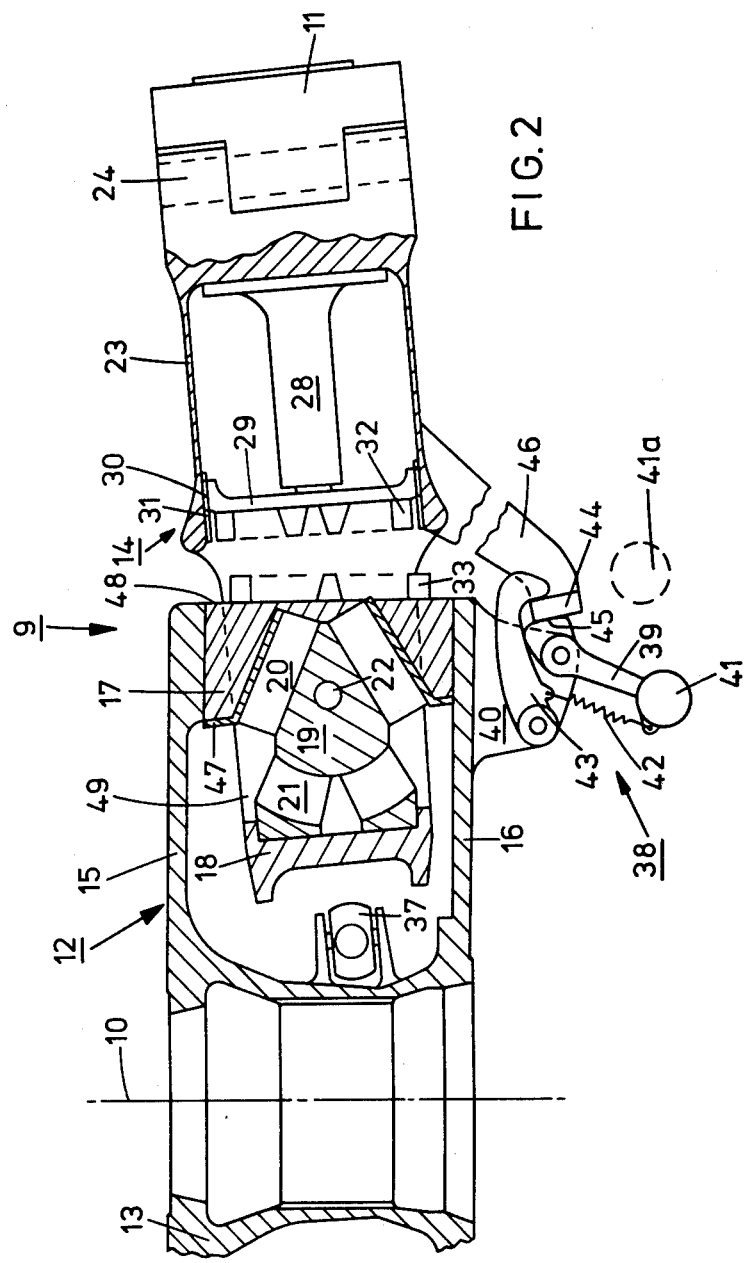

ROTOR FOR ROTARY WING AIRCRAFT

This Invention relates to a rotor for a rotary wing aircraft, and more particularly to a rotor including a hub incorporating elastomeric bearings and in which the rotor blades are foldable with respect to the rotor hub.

Elastomeric bearings may be used to mount rotor blades on a rotor hub to reduce weight and complexity by eliminating the requirement for flapping and lead/lag hinges and tension-torsion straps.

It is often desirable to provide a rotary wing aircraft with a rotor which permits the rotor blades to be folded to a position over the fuselage to reduce the amount of storage and handling area required by the aircraft during stowing and ground handling manoeuvres. This has tended to preclude the use of elastomeric bearings in such rotors due to the fact that the deflection of elastomeric bearings is limited, so that the necessary blade folding angles cannot be accomplished without impairing the bearing life. This condition is aggravated by the strain on the bearing during folding and when in its folded position, due to the weight of the blade and the tendency of the blade to rotate about its pitch change axis as it moves between its extended and folded positions.

Accordinng to one aspect of the invention I provide, for a rotary wing aircraft, a rotor including a hub arranged for rotation about a generally vertical axis and supporting a plurality of rotor blades, the rotor hub comprising, for each rotor blade, elastomeric bearing means arranged to transmit centrifugal loads from a blade to the hub and to permit pitch change, flap, and lead/lag movements of the blade, a generally vertical pivot located in supporting means outboard of the elastomeric bearing means and arranged to permit movement of the blade in a generally horizontal plane between extended and folded positions, and locking means operative to lock the pivot supporting means to the hub so as to prevent deflection of the elastomeric bearing means during movement of a blade about the pivot.

According to another aspect of the invention I provide, for a rotary wing aircraft, a rotor including a hub arranged for rotation about a generally vertical axis and supporting a plurality of rotor blades, the rotor hub comprising, a central portion, a plurality of connecting arms extending radially from the central portion, each arm comprising a first part rigidly attached to the central portion and arranged to support elastomeric bearing means, a second part supported by the elastomeric bearing means so as to be capable of movement relative the first part rotationally about its own axis and in planes parallel and perpendicular to the axis of rotation of the rotor hub, the second part including a pivot for attachment of the rotor blade and which permits folding movements of the rotor blade in a generally horizontal plane, and locking means for locking the first and second parts to prevent relative movements therebetween.

Each first part may comprise a pair of vertically spaced-apart, horizontal plate members and a joining member interconnecting outer ends thereof, and the joining member may have inner and outer surfaces and be arranged to support the elastomeric bearing means from its inner surface. Each second part may include a U-shaped inner end located between the plate members of the first part and connected to the elastomeric bearing means with its legs extending radially outwardly beyond the outer surface of the joining member, and may include means interconnecting outer ends of the legs of the connecting member, which means may be arranged to support the pivot adjacent an outer end thereof.

The means interconnecting the outer ends of the legs may comprise a hollow housing having an open end facing the outer surface of the joining member. The housing may be formed integral with the legs and may be cylindrical.

The locking means may comprise a piston supported in the housing for reciprocating axial movement relative the outer surface of the joining member, the axial movement being effective to either lock or unlock the parts, and power means, for example, a hydraulic actuator, may be provided for such movements.

Means may be provided to prevent relative rotation between the piston and housing, and such means may comprise mating axial splines in a bore in the housing and on the periphery of the piston.

Mating protrusions may be formed, respectively, on the outer surface of the joining member and the adjacent surface of the piston so that when the piston is moved towards the axis of rotation of the rotor hub to contact the outer surface of the joining member, the protrusions on both parts are engaged so as to prevent relative movements between the parts, and when the piston is retracted the protrusions are separated to permit such movements. The protrusions on each part may comprise a ring of wedge shaped teeth.

The invention will now be described by way of example only and with reference to the accompanying drawings, in which:

FIG. 1 is a fragmentary part-sectional plan view of the hub and one blade attachment of a rotor embodying the invention for a rotary wing aircraft, and FIG. 2 is a fragmentary part-sectional side elevation of the rotor of FIG. 1.

The drawings show part of a rotor for a rotary wind aircraft, the rotor comprising a hub 9 that is arranged to rotate in a horizontal plane about a generally vertical axis 10 and to support a plurality of rotor blades 11 (a root end of one only being shown) extending radially therefrom for rotation with the hub 9 during operation of the aircraft.

The rotor blades 11 are connected to the hub 9 through attachments including a plurality of radially extending connecting arms each including a first part 12 rigidly attached to a central hub portion 13, and a second part 14.

Each first part 12 includes a pair of vertically spaced-apart, horizontal plate members 15 and 16 respectively, extending radially from the central portion 13 and interconnected at their outer ends by a joining member 17 arranged to support an elastomeric bearing means 19 from an inner surface 47. Each second part 14 has a U-shaped inner end 18 located between the plate members 15 and 16 of the first part 12 and supported by the elastomeric bearing means 19 with its legs 49 extending radially outwardly from the central portion 13 straddling the joining member 17 and extending beyond an outer surface 48 of the joining member 17.

A radially extending hollow cylindrical housing 23 interconnects outer ends of the legs 49 of the second part 14 and is formed integral with the legs 49. The housing 23 has an open end facing the outer surface 48 of the joining member 17, and terminates in an outer end incorporating a generally vertical pivot 24 on which a root end of the rotor blade 11 is mounted for folding movements.

Locating and locking means 25 are provided to locate and lock the rotor blade 11 in its extended operational position.

Each elastomeric bearing means 19, supported between the inner surface 47 of the joining member 17 and the U-shaped end 18, comprises a conical bearing 20 and a part-spherical bearing 21 arranged about a focal point 22, each of the bearings 20 and 21 comprising a bonded assembly made up of alternate layers of resilient material, such as rubber, and plates of metal or other non-extensible material.

Deflection of the elastomeric bearing means 19 permits the second part 14 to perform movements relative the first part 12 rotationally about its own axis and in planes parallel and perpendicular to the axis of rotation 10 so as to permit pitch change and flap and lead/lag movements of the rotor blade 11 during operation. In operation, rotor blade flap and lead/lag movements occur about the focal point 22 of the bearing 19.

A quadrant gear 26 is pivotally mounted in the outer end of the housing 23 and meshes with a quadrant gear 27 operatively associated with the pivot 24. In the embodiment described herein the quadrant gear 26 is moved by hydraulic means (not shown) to move the blade 11 about the pivot 24 between its extended and folded positions.

A hydraulic actuator 28 is mounted within the cylindrical housing 23 to cause reciprocating axial movement of a piston 29 towards or away from the axis of rotation 10. The periphery of the piston 29 is provided with axial splines 30 mated with axial splines 31 formed on an inner surface of the housing 23 to prevent relative rotation of the parts during the axial movement of the piston 29. A ring of generally wedge shaped teeth 32 protrude inwardly from the inner surface of the piston 29 and are arranged to mesh with a ring of similar teeth protruding outwardly from the outer surface 48 of the joining member 17, supported by the plates 15 and 16, when the piston 29 is urged axially towards the axis 10 by the actuator 28 to contact the outer surface 48 of the joining member 17. In the normal operating configuration of the rotor, the piston 29 is in its retracted position as shown in the drawings, so that the teeth 32 and 33 are not in mesh.

A pitch control arm 34 operated by the flying controls (not shown) is pivotally connected to a boss 35 on one of the legs 49 of the second part 14, and an elastomeric lead/lag damper 36 is connected externally to the cylindrical housing 23 and through a rod 37 to the central portion 13.

Referring now to FIG. 2, a blade droop stop and anti-flap mechanism is generally indicated at 38 and is shown in its "at rest" position. One end of a lever 39 is pivotally mounted on a boss 40 formed at the outer end of the lower plate 16 to permit pivoting of the lever 39 in a plane perpendicular to the plane of rotation. The other end of the lever 39 is provided with a bob-weight 41 connected by a spring 42 to a hook 43 pivotally mounted on the boss 40 to extend radially outwardly so that in the at rest position shown the hook 43 contacts a surface of a boss 44 formed at the end of an arm 46 extending inwardly from the cylindrical housing 23. An inner surface of the boss 44 is in contact with a camming surface 45 formed on the lever 39, the hook also being retained in contact with the surface 45 by the spring 42.

In FIG. 2, the arm 46 is shown broken to enable the blade connecting arm to be illustrated in an operative position and the blade droop and anti-flap mechanism to be illustrated in an at rest position.

In normal operation of the illustrated rotor the piston 29 is in its retracted position as shown in the drawings and the root end of the rotor blade 11 is located and locked in its extended position by the means 25. When the rotor commences to rotate about the axis 10, the droop and anti-flap mechanism 38 is operated by centrifugal force causing the bob-weight 41 to swing to position 41 against the action of the spring 42 which also moves the camming surface 45 to lift the hook 43 out of engagement with the boss 44, thereby freeing the blade 11 for normal flapping movements.

The centrifugal load of a blade 11 is transmitted to the central portion 13 of the hub through the second part 14, the elastomeric bearing means 19, and the joining member 17 and the plates 15 and 16 of the first part 12 of the blade attachment. Rotor blade collective and cyclic pitch change movements, initiated through the control arm 34, flapping and lead/lag movements, are permitted by deflection and twisting of the elastomeric bearings 20 and 21, the flapping and lead/lag movements occurring about the focal point 22 of the bearing means 19. Damping of lead/lag movements is provided by the elastomeric damper 36.

At the conclusion of operation and before rotation of the rotor is arrested, the flying controls are centralised to enable self-centering properties of the elastomeric bearing means 19 and of the lead/lag damper 36 to position the blades 11 correctly in the lead/lag plane for engagement of the locking means to occur when it is desired to fold the blades.

As the rotor comes to rest, the droop and anti-flap mechanism 38 operates automatically to lock each blade against flapping, thereby to prevent excessive drooping of the blades 11 and undesirable flapping movements caused by gusts of wind. This operation of the mechanism 38, by its spring 42, also ensures that the blades 11 are correctly positioned in the flap plane to ensure engagement of the locking means when it is desired to fold the blades 11.

When it is desired to fold a rotor blade 11, hydraulic fluid is supplied to the actuator 28 to urge the piston 29 into contact with the outer surface 48 of the joining member 17 so that the teeth 32 mesh with the teeth 33, thereby isolating the elastomeric bearing means 19 from blade loads by positively locking the second part 14, and therefore the blade pivot 24, to the central portion 13 through the joining member 17 and the plate members 15 and 16 of the first part 12 of the blade attachments.

The lock of the locating and locking means 25 is thereupon released, conveniently by hydraulic pressure, and hydraulic pressure is applied to move the quadrant gear 26 meshed with quadrant gear 27, thereby causing movement of the rotor blade 11 about the pivot 24 in a generally horizontal plane to its folded position, without causing any deflection of the elastomeric bearing means 19.

It should be understood that it may not be desirable to fold all the blades 11 of the rotor simultaneously and that the individual blades will require folding through varying angles, depending on their position in azimuth when at rest prior to the folding operation. This can readily be accomplished by incorporating automatic sequencing and control of movement of the respective quadrant gears 26.

Because the second part 14 is locked to the first part 12 by the meshed teeth 32, 33, the blade pivot 24 is prevented from undergoing any pitch change motion during folding, any loads caused by the tendency towards such movement and by the weight of the blade 11 being transmitted through rigid structure to the central portion 13 and not through the elastomeric bearing means 19.

The present invention, therefore, provides a rotor for a rotary wing aircraft in which elastomeric bearing means are utilised to replace feathering, flap and lead/lag hinges and tension-torsion tie bars, and in which the bearings are isolated from undesirable deflections and loadings during a blade folding operation, thereby preventing damage to the bearings during this phase of operation to prolong their useful life. A further advantage is that the weight of the blade during folding is not taken through the flying controls, but is also transmitted through the locked structure.

I claim as my invention:

1. For a rotary wing aircraft a rotor including a hub arranged for rotation about a generally vertical axis and supporting a plurality of rotor blades, the rotor hub comprising, in combination,
   a central portion,
   a plurality of connecting arms extending radially from the central portion, each including first and second parts,
   each first part comprising a pair of outwardly extending opposed plates and a joining member connecting the opposed plates to define therewith a cavity,
   an elastomeric bearing means located on the radial inner side of the joining means,
   each second part including a U-shaped radial inner part with the bottom of the U passing through said cavity and connected to the radial inner side of said elastomeric bearing and the legs of the U extending radially outwardly beyond said joining member, a pivot means on the second part radially outwardly of the joining member for attaching a rotor blade to permit folding of the rotor blade in a generally horizontal plane about said pivot axis,
   and a locking means operable between the first and second parts for locking said first and second parts against movement relative to each other and for clamping in compression the said elastomeric bearing.

2. A rotor as claimed in claim 1, wherein said opposed plates comprise a pair of vertically spaced-apart horizontal plate members and said joining member interconnects outer ends thereof, each said U-shaped inner end extending horizontally between said plate members.

3. A rotor as claimed in claim 2, including means interconnecting the outer ends of the legs of the second part and forming with the legs a hollow housing having an open end facing the radial outer surface of the joining member of the first part.

4. A rotor as claimed in claim 3, wherein the locking means comprises a piston supported in the housing for reciprocating radial movement towards and away from the radial outer surface of the joining member, said radial movements of the piston effecting locking and unlocking of said locking means.

5. A rotor as claimed in claim 4, including power means for radially moving the piston.

6. A rotor as claimed in claim 5, wherein said power means comprises a hydraulic actuator.

7. A rotor as claimed in claim 4, wherein the housing is cylindrical and including means for preventing relative movement between the piston and the housing.

8. A rotor as claimed in claim 7, wherein the last said means comprises mating axial splines in a bore in the housing and on the periphery of the piston.

9. A rotor as claimed in claim 4, including mating protrusions which extend, respectively, from the outer surface of the joining member and from the adjacent surface of the piston so that when the piston is moved to contact the outer surface of the joining member the protrusions are engaged to prevent relative movement between the parts and when the piston is retracted the protrusions are separated to permit such movement.

10. A rotor as claimed in claim 9, wherein the protrusions comprise wedge shaped teeth.

11. A rotor as claimed in claim 1, wherein the elastomeric bearing means comprise a conical elastomeric bearing and a part-spherical bearing arranged about a focal point about which all flap and lead/lag movements of the rotor blade occur during operation.

12. A rotor as claimed in claim 1, including means on one of the legs of each second part for connection of a pitch control mechanism through which changes of blade pitch are effected during operation.

13. A rotor as claimed in claim 1, including a first quadrant gear operatively associated with the pivot, a second quadrant gear meshed with the first quadrant gear, and power means for moving the second quadrant gear so as to rotate the rotor blade about the pivot axis.

14. A rotor as claimed in claim 13, wherein the power means is hydraulically operated.

15. A rotor as claimed in claim 1, including means for automatically aligning the locking means when the rotor hub is at rest.

16. A rotor as claimed in claim 15, wherein the last said means includes a rotor blade droop stop and anti-flap mechanism to align the locking means in the rotor blade flapping plane.

17. A rotor as claimed in claim 16, wherein the blade droop stop and anti-flap mechanism comprises a centrifugally operated pivoted lever, a camming surface on the lever operative when the lever is moved to release an associated hook to permit blade flap movements, and a stop surface associated with the lever and operative when the lever is at rest with the hub stationary to prevent blade droop and in co-operation with the hook to prevent blade flapping movements.

18. A rotary wing aircraft having a main rotor system including a rotor as claimed in claim 1.

* * * * *